(12) United States Patent
Murakami et al.

(10) Patent No.: US 6,380,717 B2
(45) Date of Patent: Apr. 30, 2002

(54) DEVICE AND METHOD FOR CONTROLLING CHARGING OF SECONDARY BATTERY

(75) Inventors: Yusai Murakami, Shizuoka; Tadao Kimura, Hyogo; Toshiaki Nakanishi, Aichi; Toshihiro Katsuda, Aichi; Yoshiaki Kikuchi, Aichi, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/802,267

(22) Filed: Mar. 8, 2001

(30) Foreign Application Priority Data

Mar. 9, 2000 (JP) ........................ 2000-065352

(51) Int. Cl.[7] ................... H01M 10/44; H01M 10/46
(52) U.S. Cl. .................................... 320/150
(58) Field of Search ................ 320/124, 128, 320/137, 150, 153, 161

(56) References Cited

U.S. PATENT DOCUMENTS 5,550,453 A * 8/1996 Bohne et al. ............... 320/150
6,057,671 A 5/2000 Kuno

FOREIGN PATENT DOCUMENTS

| JP | 9-154239 | 6/1997 |
| JP | 10-248178 | 9/1998 |
| JP | 11-299124 | 10/1999 |

* cited by examiner

Primary Examiner—Edward H. Tso
(74) Attorney, Agent, or Firm—Merchant & Gould PC (57) ABSTRACT

A device and method is provided that can detect overcharge reliably by separating heat generated by internal resistance and heat chemically generated upon overcharging in a secondary battery. Based on the temperature of the secondary battery detected every first predetermined time by a battery temperature detection section, a temperature gradient operation section calculates a temperature gradient indicating a temperature increase per unit time for every second predetermined time that is longer than the first predetermined time. When a temperature gradient determination section determines that the temperature gradient is larger than a predetermined temperature gradient threshold, which is preset according to the charged state of the secondary battery, N times in a row (where N is a natural number), a fully charged state of the secondary battery is detected.

12 Claims, 6 Drawing Sheets

Temperature Gradient Threshold (TH) Table

| | | Cooling Power CP | | | |
|---|---|---|---|---|---|
| | | 0 | Low | Medium | High |
| Average Load Current Iave[A] | 0 | | | | |
| | 5 | | | | Small |
| | 10 | | | | |
| | 15 | | | | |
| | 20 | | | | |
| | 25 | | | | |
| | 30 | Large | | | |

DEVICE AND METHOD FOR CONTROLLING CHARGING OF SECONDARY BATTERY

BACKGROUND OF THE INVENTION

1. Field of the Invention

The present invention relates generally to a technique of controlling the charging of a secondary battery, particularly to a technique of preventing a secondary battery, which is used for applications in which the secondary battery is charged and discharged repeatedly in a charged but not fully charged state, from being overcharged by controlling the charging of the secondary battery.

2. Related Background Art

Examples of the secondary battery include lead batteries, nickel-cadmium (Ni—Cd) batteries, nickel metal-hydride (Ni—MH) batteries, and lithium ion batteries. Such batteries have a characteristic allowing them to be connected to an external power source to be charged with a predetermined current supplied from the power source after consumption of their electric power. These batteries have been used for various equipment, making good use of such a characteristic. For instance, such a battery may be mounted on a vehicle to supply electric power to an ignition plug of its engine. Recently, such a battery also is used as a main power source for driving an electric motor in a so-called hybrid electric vehicle (HEV) provided with an engine and the electric motor.

Every battery has its own limit in terms of the chargeable amount of electric power. Therefore, it is necessary to control the charging amount so that the battery is charged in a range not exceeding the chargeable capacity. When the battery is charged with an amount of electric power exceeding the limit (overcharged), there has been a possibility that the lifetime of the battery may be shortened. In addition, the detection of overcharge is indispensable for securing driving ability while a vehicle is driven.

Conventionally, a general method as a method of detecting overcharge of a battery includes detecting temperature variations in a battery during charging and determining that the battery has reached a fully charged state at a time a temperature variation per unit time, i.e. a temperature gradient, increases abruptly.

In the case of a battery mounted on, for example, a hybrid electric vehicle, however, the battery may be charged and discharged repeatedly while the vehicle is driven. In the hybrid electric vehicle, when the output of its engine is higher than the required power for driving, a generator is driven with the surplus power to charge the battery. On the contrary, when the output of the engine is lower than the required power, an electric motor is driven with the electric power of the battery to output the power covering a shortage of the required power. In this case, the battery is discharged. Such repeated charge and discharge are carried out according to the driving state of the vehicle, the charged state of the battery, and an operation of a driver.

Generally, a battery generates the Joule heat due to the loss caused by internal resistance (DC-IR) of the battery when the battery is charged and discharged. The amount of the heat thus generated is proportional to the square of an effective value of a current. Therefore, when charge and discharge are repeated as in the case where the battery is mounted on a hybrid electric vehicle, the temperature gradient abruptly changes even when the battery has not reached a fully charged state. Therefore, a wrong determination that the battery has reached the fully charged state may be made to stop the charging. As a result, the battery cannot be charged sufficiently and there is a possibility of troubles such that the battery goes flat.

As a method of solving the above-mentioned problem, for example, JP 11(1999)-299124 discloses a method including detecting a temperature gradient during charging caused in connection with the charging from the temperature gradient indicating a temperature increase per unit time or a temperature gradient during charging, calculated by subtracting a corrected amount of the temperature gradient caused by discharge from the temperature gradient indicating a temperature increase per unit time, and terminating the charging of a secondary battery when the temperature gradient is larger than a predetermined temperature gradient preset according to a charged state of the secondary battery.

However, in a working environment of a hybrid electric vehicle or an electric vehicle, the current values in charging and discharging the secondary battery are large and therefore the amount of heat generated by the internal resistance (DC-IR) of the secondary battery is large. In addition, the charging current and discharged current change instantaneously and heat is generated with a time difference. Therefore, the cause of the heat generation cannot be specified from instantaneous values of the currents. For such reasons, it has been difficult to detect overcharge by separating the heat generated by the DC-IR to determine the temperature gradient caused by a chemical heat-generating reaction alone upon overcharging.

SUMMARY OF THE INVENTION

With the foregoing in mind, it is an object of the present invention to provide a charging control device and method that reliably can detect overcharge by separating heat generated by internal resistance and heat chemically generated upon overcharging in a secondary battery.

In order to achieve the above-mentioned object, a charging control device according to the present invention is a device for controlling the charging of a secondary battery used for applications in which the secondary battery is charged and discharged repeatedly in a charged but not fully charged state. The charging control device includes a battery temperature detecting section, a temperature gradient operation section, and a temperature gradient determination section. The battery temperature detecting section detects the temperature of the secondary battery every first predetermined time. The temperature gradient operation section calculates a temperature gradient indicating a temperature increase per unit time for every second predetermined time that is longer than the first predetermined time, based on the temperature detected by the battery temperature detecting section. The temperature gradient determination section determines whether the temperature gradient calculated by the temperature gradient operation section is larger than a predetermined temperature gradient threshold preset according to a charged state of the secondary battery. When the temperature gradient determination section determines that the temperature gradient calculated by the temperature gradient operation section is larger than the predetermined temperature gradient threshold N times in a row (where N is a natural number), a fully charged state of the secondary battery is detected.

According to this charging control device, based on the temperature detected every first predetermined time, the temperature gradient operation section calculates the temperature gradient every second predetermined time that is longer than the first predetermined time, and then a fully charged state of the secondary battery is detected when the temperature gradient determination section determines that the temperature gradient calculated exceeds the predetermined temperature gradient threshold N times in a row (where N is a natural number). Thus, the influence of the heat instantaneously generated due to the repeated charge and discharge of the secondary battery while a hybrid electric vehicle or the like is driven is removed and the heat generated by the internal resistance and the heat chemically generated upon overcharging in the secondary battery are separated. Consequently, the overcharge can be detected reliably.

This can prevent the deterioration and life-shortening of the secondary battery due to the overcharge. In addition, the secondary battery can be used up to a range in which a high level of charging is required, and therefore the driving ability can be secured easily while a vehicle is driven.

In the charging control device, it is preferable that the temperature gradient operation section takes an operation result as being valid when an average load current of the secondary battery indicates a direction of charging the secondary battery.

According to this configuration, the temperature gradient calculated is used for overcharge detection when the average load current of the secondary battery indicates the charging direction, so that overcharge further can be detected reliably.

In the charging control device, it is preferable that a temperature gradient threshold preset according to at least one of the magnitude of an average load current of the secondary battery and cooling power of the secondary battery is used as the predetermined temperature gradient threshold.

According to this configuration, the temperature gradient threshold is set according to at least one of the magnitude of the average load current and the cooling power of the secondary battery, so that overcharge further can be detected accurately.

Preferably, a value of the average load current is an average value of load currents detected every first predetermined time during every second predetermined time.

In the charging control device, it also is preferable that the second predetermined time is longer than a time, detected every first predetermined time, of variations in load current due to charge and discharge of the secondary battery.

According to this configuration, the influence of the heat instantaneously generated due to the repeated charge and discharge of the secondary battery while a hybrid electric vehicle or the like is driven is removed, and the heat generated by the internal resistance and the heat chemically generated upon overcharging in the secondary battery are separated. Consequently, the overcharge can be detected reliably.

Furthermore, in the charging control device, preferably, the temperature gradient operation section determines the temperature gradient by a moving average operation.

According to this configuration, the temperature gradient is determined not with a simple average but with a moving average, so that overcharge can be detected further accurately.

In order to achieve the above-mentioned object, a charging control method of the present invention is a method for controlling the charging of a secondary battery used for applications in which the secondary battery is charged and discharged repeatedly in a charged but not fully charged state. The method includes detecting the temperature of the secondary battery every first predetermined time, calculating a temperature gradient indicating a temperature increase per unit time for every second predetermined time that is longer than the first predetermined time, based on the temperature detected, determining whether the temperature gradient thus calculated is larger than a predetermined temperature gradient threshold preset according to a charged state of the secondary battery, and detecting a fully charged state of the secondary battery when it is determined that the temperature gradient calculated is larger than the predetermined temperature gradient threshold N times in a row (where N is a natural number).

According to this charging control method, based on the temperature detected every first predetermined time, the temperature gradient is calculated every second predetermined time that is longer than the first predetermined time. When the temperature gradient thus calculated exceeds the predetermined temperature gradient threshold N times in a row (where N is a natural number), a fully charged state of the secondary battery is detected. Thus, the influence of the heat instantaneously generated due to the repeated charge and discharge of the secondary battery while a hybrid electric vehicle or the like is driven is removed and the heat generated by the internal resistance and the heat chemically generated upon overcharging in the secondary battery are separated. Consequently, the overcharge can be detected reliably.

This can prevent the deterioration and life-shortening of the secondary battery due to overcharge. In addition, the secondary battery can be used in a range up to a range in which a high level of charging is required, and therefore the driving ability can be secured easily while a vehicle is driven.

In the charging control method, it is preferable that an operation result of the temperature gradient is taken as being valid when an average load current of the secondary battery indicates a direction of charging the secondary battery.

According to this method, the temperature gradient calculated is used for the overcharge detection when the average load current of the secondary battery indicates the charging direction, so that overcharge further can be detected reliably.

In the charging control method, it also is preferable that a temperature gradient threshold preset according to at least one of the magnitude of an average load current of the secondary battery and cooling power of the secondary battery is used as the predetermined temperature gradient threshold.

According to this method, the temperature gradient threshold is set according to at least one of the magnitude of the average load current and the cooling power of the secondary battery, so that overcharge further can be detected accurately.

Preferably, a value of the average load current is an average value of load currents detected every first predetermined time during every second predetermined time.

In the charging control method, it is preferable that the second predetermined time is longer than a time, detected every first predetermined time, of variations in load current due to charge and discharge of the secondary battery.

According to this method, the influence of the heat instantaneously generated due to the repeated charge and discharge of the secondary battery while a hybrid electric vehicle or the like is driven is removed and the heat generated by the internal resistance and the heat chemically generated upon overcharging in the secondary battery are separated. Consequently, the overcharge can be detected reliably.

Moreover, in the charging control method, it is preferable that the temperature gradient is determined by a moving average operation.

According to this method, the temperature gradient is determined not with a simple average but with a moving average, so that overcharge further can be detected accurately.

DETAILED DESCRIPTION OF THE INVENTION

Embodiments of the present invention are described using drawings as follows.
First Embodiment FIG. 1 is a block diagram showing a configuration of a charging control device according to a first embodiment of the present invention.

Figure 1:
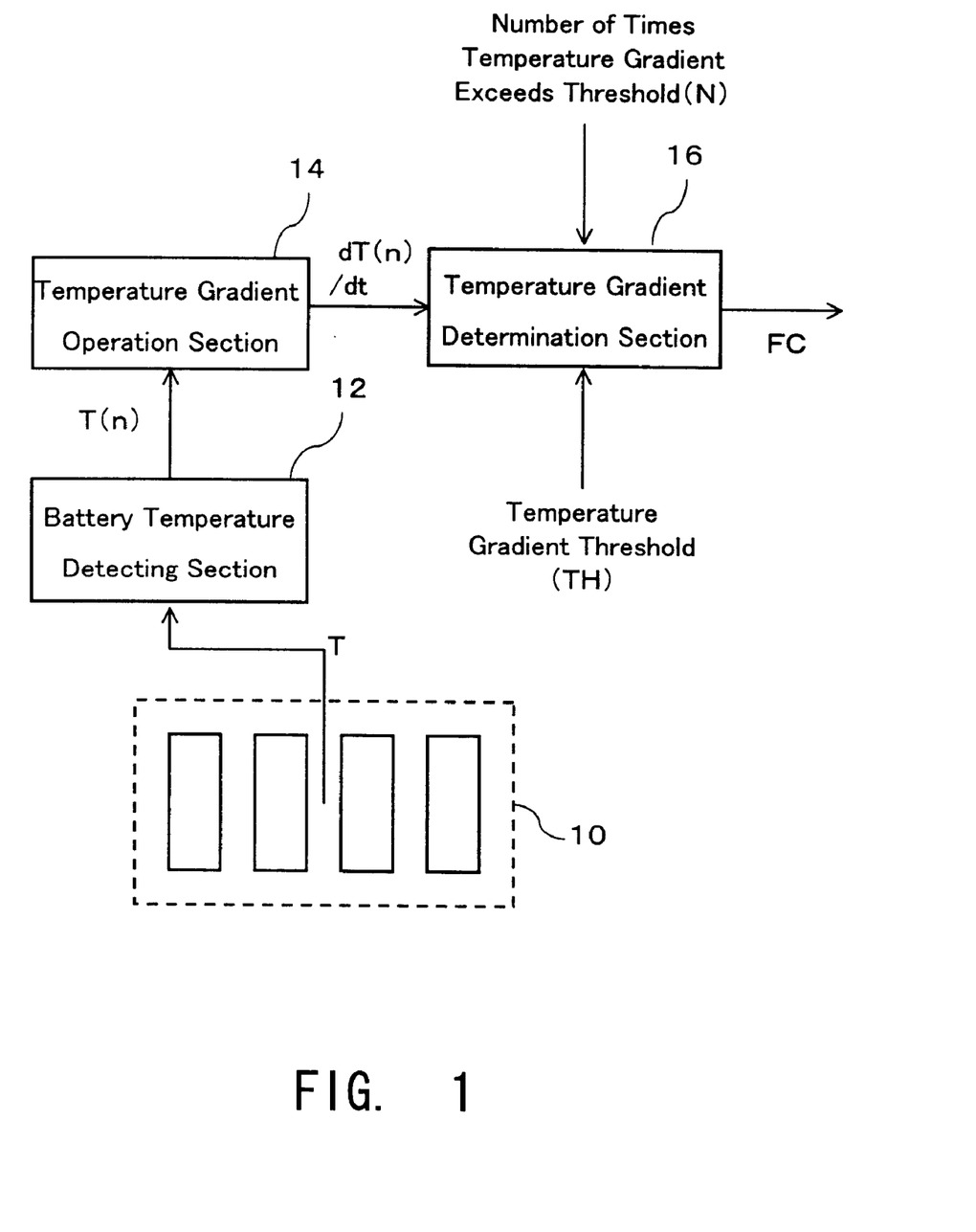
FIG. 1 is a block diagram showing a configuration of a charging control device according to a first embodiment of the present invention.

In FIG. 1, numeral 10 indicates a secondary battery, for example, a nickel-hydrogen battery to be mounted on a hybrid electric vehicle or the like. Generally, this secondary battery 10 is made of a battery pack including a combination battery with a number of cells combined to obtain a predetermined output power. Numeral 12 denotes a battery temperature detecting section, in which the battery temperature measured by a temperature sensor (not shown in the figure) placed in a predetermined position inside the secondary battery 10 is sampled every first predetermined time t1, for example every 0.1 second, and thus a battery temperature sample T(n) is obtained.

Numeral 14 indicates a temperature gradient operation section that calculates a temperature gradient $dT(n)/dt$ (=K) indicating a temperature increase per unit time set to be a second predetermined time t2, for instance, 20 seconds, with respect to the battery temperature sample T(n) output from the battery temperature detecting section 12. This second predetermined time t2 is set to be longer than the first predetermined time t1 as the time for sampling the battery temperature and also may be longer than the time of variation in load current due to the repeated charge and discharge of the secondary battery 10 while a hybrid electric vehicle or the like is driven.

Furthermore, in the temperature gradient operation section 14, not an operation for obtaining a simple average but that for obtaining a moving average is employed for determining the temperature gradient. The moving average is obtained as follows. For example, a temperature gradient $K_i$ is obtained between a certain time ti and a time ti+20 after a second predetermined time (20 seconds) from the time ti and then a temperature gradient $K_{i+}$ is obtained between a time ti+0.1 after a first predetermined time (0.1 second) from the time ti and a time ti+20.1 after the second predetermined time (20 seconds) from the time ti+0.1. Then the average of $K_i$ and $K_{i+}1$ is calculated. This procedure is repeated sequentially.

In this case, as the second predetermined time t2 increases, the influence of the heat generated by the internal resistance (DC-IR) in the secondary battery 10 can be removed increasingly, but the operation becomes slower and thus the secondary battery 10 tends to come into an overcharged state.

Numeral 16 denotes a temperature gradient determination section. The determination section 16 determines whether the temperature gradients $dT(n)/dt$ sequentially output from the temperature gradient operation section 14 are larger than the predetermined temperature gradient threshold TH preset according to the charged state of the secondary battery, determines that the secondary battery 10 is in a fully charged state when the temperature gradient $dT(n)/dt$ exceeds the temperature gradient threshold TH N times, for example three times, in a row, and outputs a signal FC for notifying of the fully charged state.

Next, the following description is directed to a control process in the first embodiment configured as described above.

Figure 2:
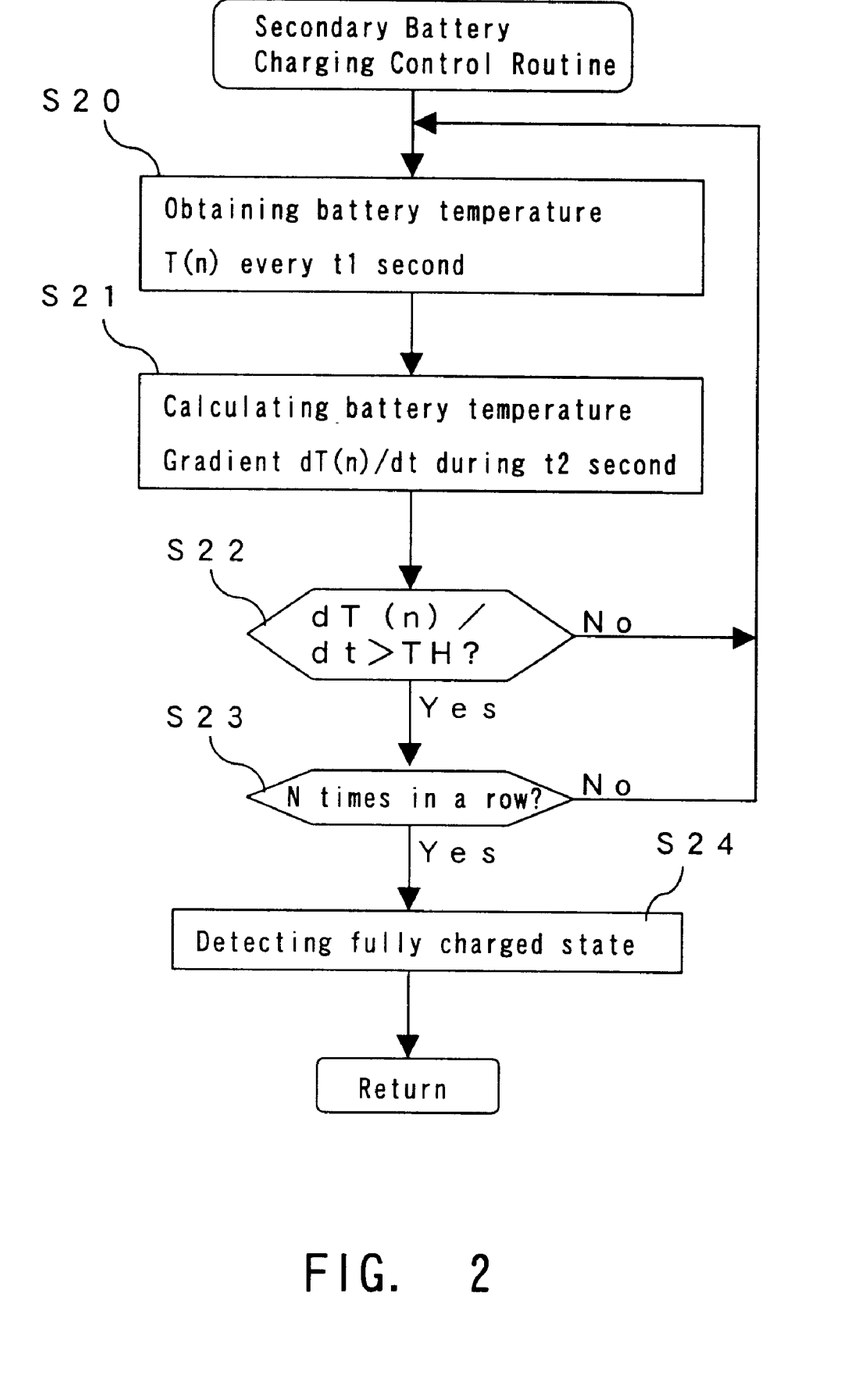
FIG. 2 is a flow chart showing a secondary battery charging control routine according to the first embodiment of the present invention.

FIG. 2 is a flow chart showing a secondary battery charging control routine according to the first embodiment of the present invention.

First, a battery temperature T(n) is obtained by being sampled every first predetermined time t1 (S20). Based on the battery temperature sample T(n) thus obtained, the temperature gradient $dT(n)/dt$ during the second predetermined time t2 is determined by a moving average operation (S21).

Next, it is determined whether the temperature gradient $dT(n)/dt$ determined at step S21 exceeds the predetermined temperature gradient threshold TH (S22). As a result of the determination at step S22, when the temperature gradient $dT(n)/dt$ is not larger than the temperature gradient threshold TH, the procedure is returned to step S20, and obtaining the battery temperature sample T(n) continues.

As a result of the determination at step S22, when the temperature gradient $dT(n)/dt$ exceeds the temperature gradient threshold TH, the procedure is advanced to step S23 and it is determined whether the temperature gradient $dT(n)/dt$ exceeds the temperature gradient threshold TH N times in a row. At step S23, when the temperature gradient $dT(n)/dt$ does not exceed the temperature gradient threshold TH N times in a row, it is determined that the temperature increase is not caused by the heat chemically generated in the fully charged state and the procedure also is returned to step S20 and obtaining the battery temperature sample T(n) continues.

As a result of the determination at step S23, when the temperature gradient $dT(n)/dt$ exceeds the temperature gradient threshold TH N times in a row, it is determined that the temperature increase is caused by the heat chemically generated in the fully charged state and detects that the battery is currently in the fully charged state and further charging results in overcharge (S24). Thus, the secondary battery charging control routine is ended.

Second Embodiment

Figure 3:
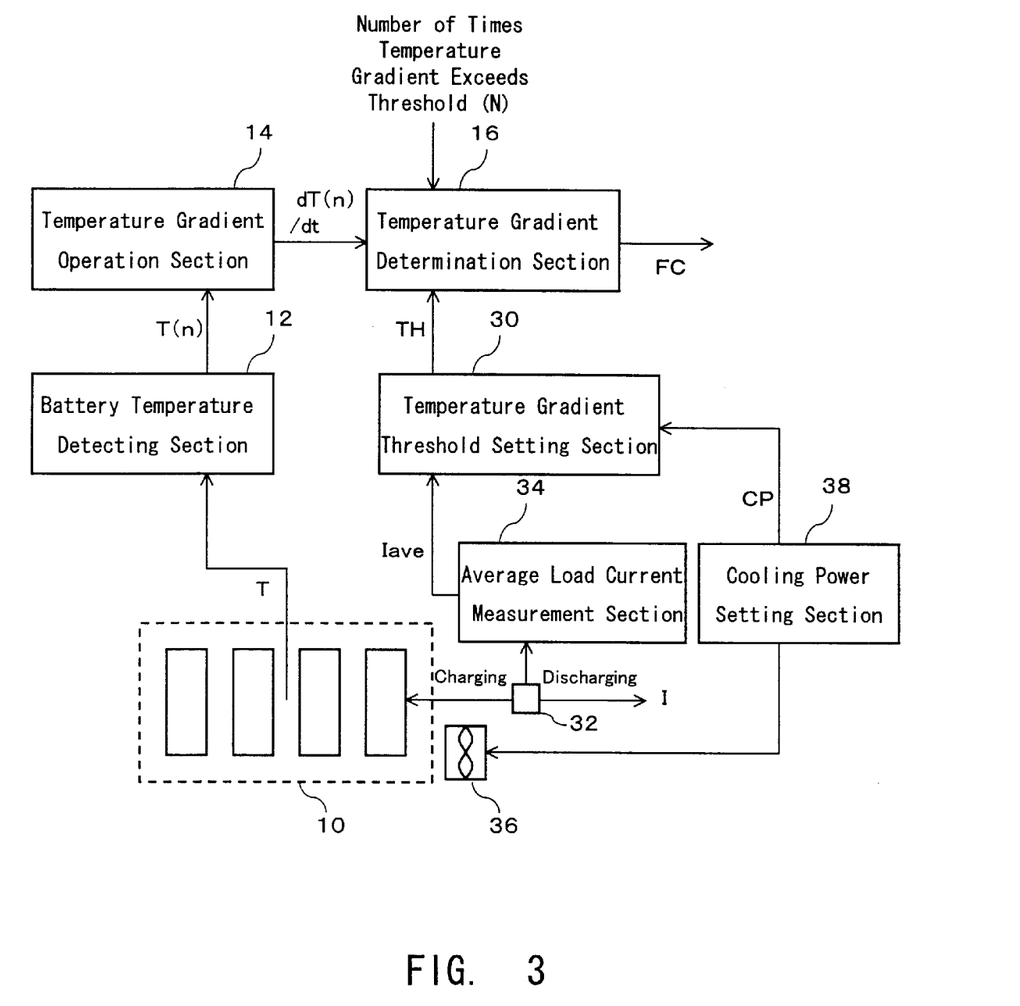
FIG. 3 is a block diagram showing a configuration of a charging control device according to a second embodiment of the present invention.

FIG. 3 is a block diagram showing a configuration of a charging control device according to a second embodiment of the present invention. The present embodiment is different from the first embodiment in that the temperature gradient threshold is set variably depending on the average load current and cooling power of a secondary battery. Configurations and functions of a battery temperature detecting section 12, a temperature gradient operation section 14, and a temperature gradient determination section 16 are identical with those in the first embodiment. Therefore, their descriptions are not repeated.

In FIG. 3, numeral 32 is a current sensor for detecting a load current caused by the charge and discharge of a secondary battery. The load current detected by the current sensor 32 is supplied to an average load current measurement section 34. The measurement section 34 samples a load current (I(n)) every first predetermined time, for example, every 0.1 second, for sampling the battery temperature described in the first embodiment, obtains the average during the second predetermined time, for example, during 20 seconds, and outputs it as an average load current Iave.

Numeral 36 is a secondary battery cooling means such as a cooling fan or the like. A cooling power setting section 38 sets the cooling power CP, for instance, the rotational speed of the cooling fan, according to the temperature of the secondary battery to prevent the secondary battery performance from deteriorating.

The average load current Iave output from the measurement section 34 and the cooling power CP output from the cooling power setting section 38 are supplied to a temperature gradient threshold setting section 30. The setting section 30 determines a temperature gradient threshold TH according to the magnitude of the average load current Iave and the cooling power CP input thereto and sets the temperature gradient threshold TH for the temperature gradient determination section 16.

Figure 4:
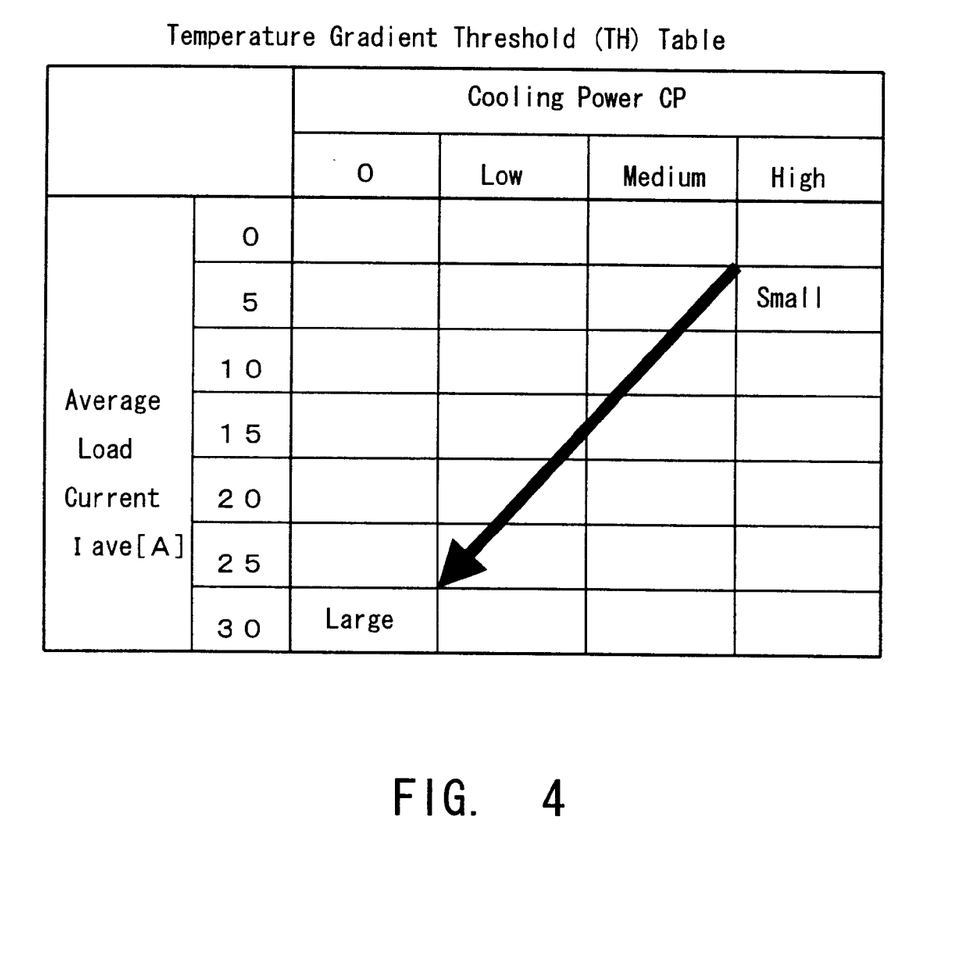
FIG. 4 is a table showing a temperature gradient threshold TH to be set with respect to an average load current Iave and cooling power CP.

FIG. 4 is a diagram showing a table of the temperature gradient threshold TH set with respect to the average load current Iave and the cooling power CP. In FIG. 4, since the temperature gradient in a fully charged state decreases with the increase in the cooling power CP, the value of the temperature gradient threshold TH is set to be smaller accordingly. In addition, since the temperature gradient in a fully charged state increases with the increase in charging rate of the average load current Iave, the value of the temperature gradient threshold TH is set to be larger accordingly.

Figure 5:
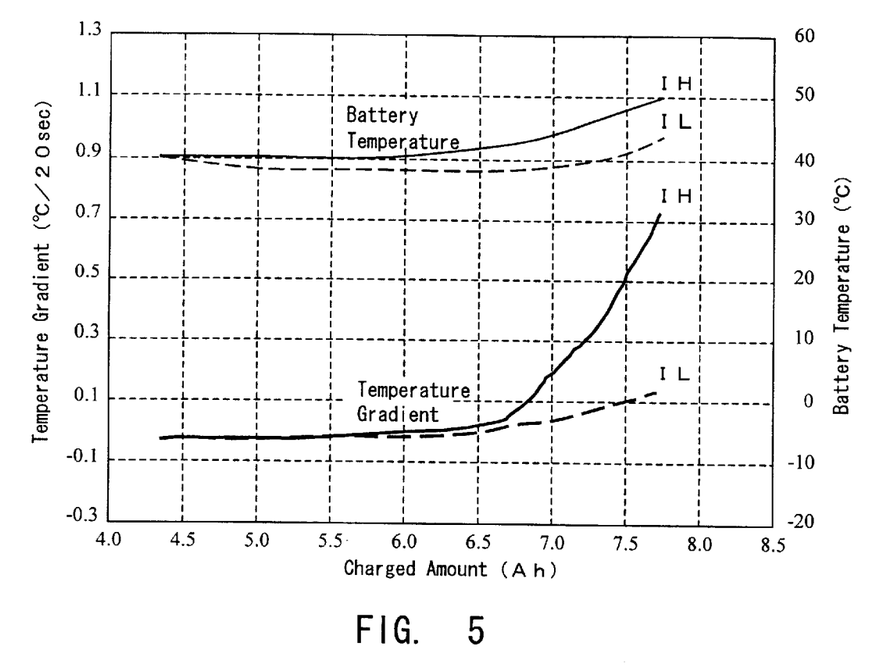
FIG. 5 is a graph showing curves of battery temperature and temperature gradients with respect to a charged amount in the cases of a low charging rate (IL) and a high charging rate (IH) of the average load current Iave.

FIG. 5 is a graph showing curves of battery temperature and temperature gradients with respect to a charged amount in the cases of a low charging rate (IL) and a high charging rate (IH) of the average load current Iave.

Figure 6:
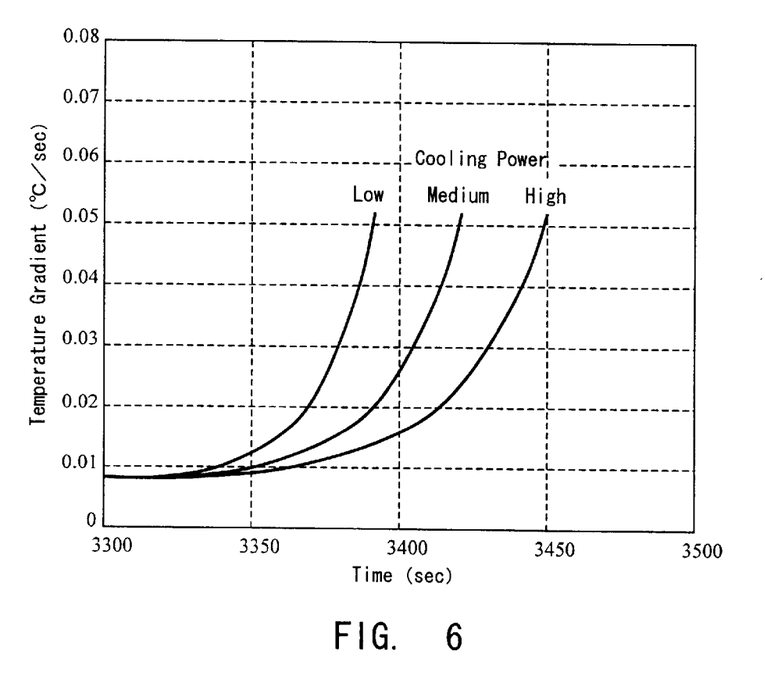
FIG. 6 is a graph showing curves of temperature gradients with respect to elapsed time in the cases of low, medium, and high cooling power of a secondary battery.

FIG. 6 is a graph showing curves of temperature gradients with respect to elapsed time in the cases of low, medium, and high cooling power of a secondary battery.

Next, the following description is directed to a control process in the present embodiment configured as described above.

Figure 7:
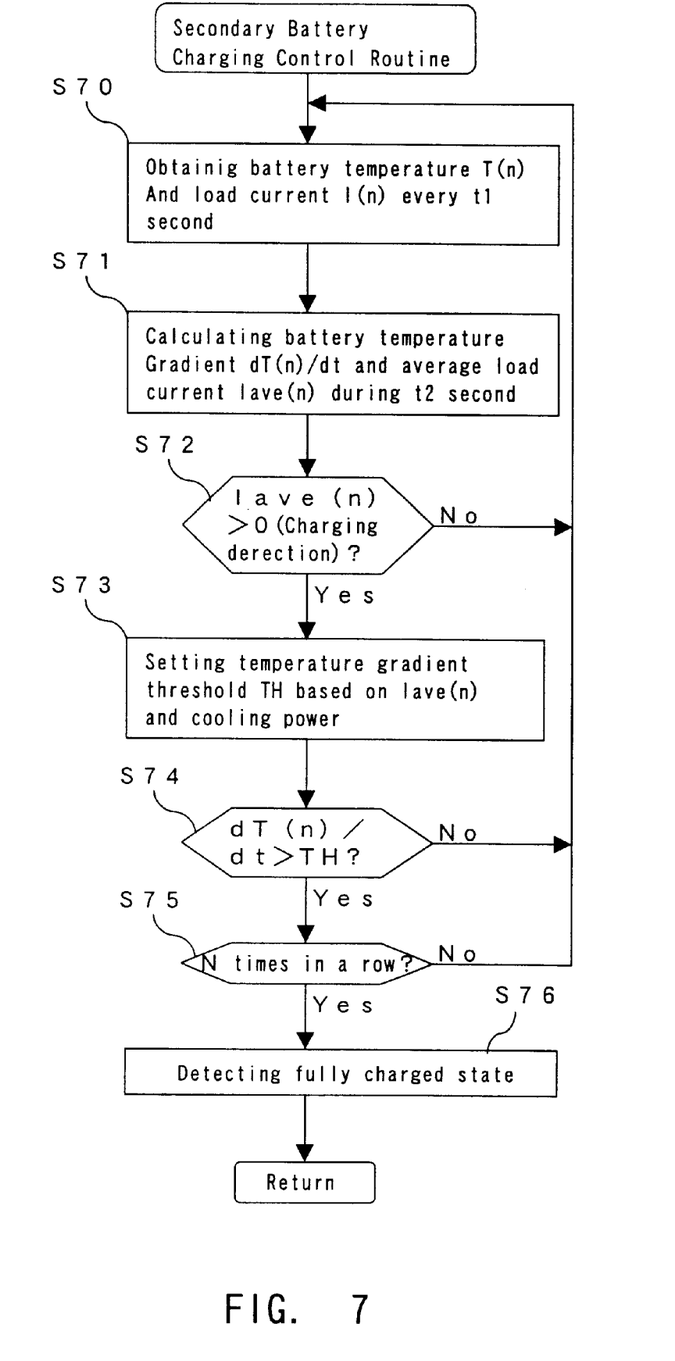
FIG. 7 is a flow chart showing a secondary battery charging control routine according to the second embodiment of the present invention.

FIG. 7 is a flow chart showing a secondary battery charging control routine according to the second embodiment of the present invention.

Initially, a battery temperature T(n) and a load current I(n) are obtained by being sampled every first predetermined time t1 (S70). Based on the battery temperature sample T(n) thus obtained, the temperature gradient dT(n)/dt during a second predetermined time t2 is determined by a moving average operation. In addition, based on the load current sample I (n) thus obtained, the average load current Iave during the second predetermined time t2 is determined (S71).

Next, it is determined whether the average load current Iave determined at step S71 indicates the charging direction (whether the average load current Iave is larger than zero). As a result of the determination at step S72, when the average load current Iave does not indicate the charging direction (i.e. indicates a discharging direction), the procedure is returned to step S70 and obtaining the battery temperature sample T(n) and the load current sample I(n) continues.

As a result of the determination at step S72, when the average load current Iave indicates the charging direction (when the average load current Iave is larger than zero), the procedure is advanced to step S73 and based on the magnitude of the average load current Iave and the cooling power, an optimum temperature gradient threshold TH is set.

Next, it is determined whether the temperature gradient dT(n)/dt determined at step S71 exceeds the temperature gradient threshold TH set at step S73 (S74). As a result of the determination at step S74, when the temperature gradient dT(n)/dt is not more than the temperature gradient threshold TH, the procedure is returned to step S70 and obtaining the battery temperature sample T(n) and the load current sample I(n) continues.

As a result of the determination at step S74, when the temperature gradient dT(n)/dt exceeds the temperature gradient threshold TH, the procedure is advanced to step S75 and it is determined whether the temperature gradient dT(n)/dt exceeds the temperature gradient threshold TH N times in a row. At step S75, when the temperature gradient dT(n)/dt does not exceed the temperature gradient threshold TH N times in a row, it is determined that the temperature increase is not caused by the heat chemically generated in the fully charged state and the procedure also is returned to step S70 and obtaining the battery temperature sample T(n) and the load current sample I(n) continues.

As a result of the determination at step S75, when the temperature gradient dT(n)/dt exceeds the temperature gradient threshold TH N times in a row, it is determined that the temperature increase is caused by the heat chemically generated in the fully charged state. It is detected that the secondary battery is currently in the fully charged state and further charging results in overcharge (S76), and thus the secondary battery charging control routine is ended.

As described above, according to the present invention, the temperature gradient in the case where the average load current Iave indicates the charging direction is compared with the optimum temperature gradient threshold TH preset according to the magnitude of the average load current Iave and the cooling power of the secondary battery. Therefore, a fully charged state can be detected with higher accuracy than that in the first embodiment.

Moreover, in the embodiments of the present invention, the first predetermined time t1 for sampling the battery temperature was set to be 0.1 second, the second predetermined time t2 for the calculation of the temperature gradient to be 20 seconds, and the number of times N the temperature gradient exceeds the threshold to be 3. However, the present invention is not limited to those numerical values. For instance, those numerical values can be changed according to the specification of the secondary battery, vehicle load characteristics, a driving pattern of a vehicle, or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A charging control device for controlling charging of a secondary battery used for applications in which the secondary battery is charged and discharged repeatedly in a charged but not fully charged state, comprising:

a battery temperature detecting section for detecting a temperature of the secondary battery every first predetermined time;

a temperature gradient operation section for calculating a temperature gradient, indicating a temperature increase per unit time, every second predetermined time that is longer than the first predetermined time, based on the temperature detected by the battery temperature detecting section; and a temperature gradient determination section for determining whether the temperature gradient calculated by the temperature gradient operation section is larger than a predetermined temperature gradient threshold preset according to a charged state of the secondary battery, wherein when the temperature gradient determination section determines that the temperature gradient calculated by the temperature gradient operation section is larger than the predetermined temperature gradient threshold N times in a row (where N is a natural number), a fully charged state of the secondary battery is detected.

2. The charging control device according to claim 1, wherein the temperature gradient operation section takes an operation result as being valid when an average load current of the secondary battery indicates a direction of charging the secondary battery.

3. The charging control device according to claim 1, wherein a temperature gradient threshold preset according to at least one of a magnitude of an average load current of the secondary battery and cooling power of the secondary battery is used as the predetermined temperature gradient threshold.

4. The charging control device according to claim 2, wherein a value of the average load current is an average value of load currents detected every first predetermined time during every second predetermined time.

5. The charging control device according to claim 1, wherein the second predetermined time is longer than a time, detected every first predetermined time, of variations in load current due to charge and discharge of the secondary battery.

6. The charging control device according to claim 1, wherein the temperature gradient operation section determines the temperature gradient by a moving average operation.

7. A charging control method for controlling charging of a secondary battery used for applications in which the secondary battery is charged and discharged repeatedly in a charged but not fully charged state, comprising:

detecting a temperature of the secondary battery every first predetermined time;

calculating a temperature gradient indicating a temperature increase per unit time for every second predetermined time that is longer than the first predetermined time, based on the temperature detected;

determining whether the temperature gradient thus calculated is larger than a predetermined temperature gradient threshold preset according to a charged state of the secondary battery; and detecting a fully charged state of the secondary battery when it is determined that the temperature gradient calculated is larger than the predetermined temperature gradient threshold N times in a row (where N is a natural number).

8. The charging control method according to claim 7, wherein an operation result of the temperature gradient is taken as being valid when an average load current of the secondary battery indicates a direction of charging the secondary battery.

9. The charging control method according to claim 7, wherein a temperature gradient threshold preset according to at least one of a magnitude of an average load current of the secondary battery and cooling power of the secondary battery is used as the predetermined temperature gradient threshold.

10. The charging control method according to claim 8, wherein a value of the average load current is an average value of load currents detected every first predetermined time during every second predetermined time.

11. The charging control method according to claim 7, wherein the second predetermined time is longer than a time, detected every first predetermined time, of variations in load current due to charge and discharge of the secondary battery.

12. The charging control method according to claim 7, wherein the temperature gradient is determined by a moving average operation.

* * * * *